US00RE50832E

(19) United States
(12) Reissued Patent
Famaey

(10) Patent Number: US RE50,832 E
(45) Date of Reissued Patent: Mar. 17, 2026

(54) SERVICE PROVISIONING IN A COMMUNICATION NETWORK

(71) Applicants: Koninklijke KPN N.V., Rotterdam (NL); IMEC VZW, Leuven (BE); UNIVERSITEIT GENT, Ghent (BE)

(72) Inventor: Jeroen Maurice Margaretha Famaey, Zwijndrecht (BE)

(73) Assignees: Koninklijke KPN N.V., Rotterdam (NL); IMEC VZW, Leuven (BE); Universiteit Gent, Ghent (BE)

(21) Appl. No.: 18/381,986

(22) Filed: Oct. 19, 2023

Related U.S. Patent Documents

Reissue of:
(64) Patent No.: 10,439,959
Issued: Oct. 8, 2019
Appl. No.: 15/213,956
Filed: Jul. 19, 2016

(30) Foreign Application Priority Data

Jul. 20, 2015 (EP) ..... 15177503

(51) Int. Cl.
*G06F 15/16* (2006.01)
*G06F 9/50* (2006.01)
(Continued)

(52) U.S. Cl.
CPC ..... *H04L 41/5054* (2013.01); *G06F 9/5077* (2013.01); *H04L 12/4641* (2013.01);
(Continued)

(58) Field of Classification Search
CPC ..... H04L 12/4641; H04L 41/0895; H04L 41/0896; H04L 41/12; H04L 41/40;
(Continued)

(56) References Cited

U.S. PATENT DOCUMENTS 7,240,364 B1 * 7/2007 Branscomb ..... H04L 29/12113 726/5
9,509,626 B2 * 11/2016 Adolph ..... G06F 8/63
(Continued)

FOREIGN PATENT DOCUMENTS

WO WO 2014/086978 A1 6/2014

OTHER PUBLICATIONS

Bouten et al., "Semantic Validation of Affinity Constrained Service Function Chain Requests", 2016, Jun. 6-10, IEEE NetSoft Conference and Workshops 2016, pp. 202-210 (Year: 2016).*
(Continued)

*Primary Examiner* — William H. Wood
(74) *Attorney, Agent, or Firm* — Hamilton, Brook, Smith & Reynolds, P.C.

(57) ABSTRACT

A method of provisioning a service in a communication network is described, in which the service comprises at least one virtual network function and at least one virtual network path, which at least one virtual network function and at least one virtual network path are to be implemented in the communication network. The method including obtaining affinity constraints and/or anti-affinity constraints relating to mapping the at least one virtual network path onto the communication network, optionally obtaining affinity constraints and/or anti-affinity constraints relating to mapping the at least one virtual network function onto the communication network, and mapping the at least one virtual network function and at least one virtual network path onto the communication network subject to said constraints.

15 Claims, 5 Drawing Sheets

(51) Int. Cl.

| | |
|---|---|
| ***H04L 12/24*** | (2006.01) |
| ***H04L 12/46*** | (2006.01) |
| ***H04L 12/713*** | (2013.01) |
| ***H04L 12/725*** | (2013.01) |
| ***H04L 12/911*** | (2013.01) |
| ***H04L 29/08*** | (2006.01) |
| ***H04L 41/12*** | (2022.01) |
| ***H04L 41/40*** | (2022.01) |
| ***H04L 41/5054*** | (2022.01) |
| ***H04L 45/302*** | (2022.01) |
| ***H04L 45/586*** | (2022.01) |
| ***H04L 47/70*** | (2022.01) |
| ***H04L 67/51*** | (2022.01) |
| *H04L 41/0895* | (2022.01) |
| *H04L 41/0896* | (2022.01) |

(52) U.S. Cl.
CPC ..... *H04L 41/12* (2013.01); *H04L 41/40* (2022.05); *H04L 45/302* (2013.01); *H04L 45/586* (2013.01); *H04L 47/827* (2013.01); *H04L 67/51* (2022.05); *H04L 41/0895* (2022.05); *H04L 41/0896* (2013.01)

(58) Field of Classification Search
CPC . H04L 41/5054; H04L 45/302; H04L 45/586; H04L 47/827; H04L 67/51; G06F 9/5077
See application file for complete search history.

(56) References Cited

U.S. PATENT DOCUMENTS

2009/0070771 A1* 3/2009 Yuyitung ..... G06Q 10/06 718/105
2013/0042003 A1* 2/2013 Franco ..... H04L 67/1097 709/226
2013/0132854 A1* 5/2013 Raleigh ..... G06F 3/0482 715/738
2013/0185438 A1 7/2013 Lumezanu et al.
2014/0059178 A1 2/2014 Dutta et al.
2014/0101300 A1* 4/2014 Rosensweig ..... G06F 9/5072 709/223
2015/0143456 A1* 5/2015 Raleigh ..... H04W 12/08 726/1
2016/0142338 A1* 5/2016 Steinder ..... H04L 41/0813 709/226
2017/0048165 A1* 2/2017 Yu ..... H04L 41/044
2017/0078216 A1* 3/2017 Adolph ..... H04L 41/0896

OTHER PUBLICATIONS

Sonnek, J. et al., "Starling: Minimizing Communication Overhead in Virtualized Computing Platforms Using Decentralized Affinity-Aware Migration", pp. 12 (Dec. 2009).
Ayadi, I., et al., "QoS-based network virtualization to future networks: An approach based on network constraints," 2013 Fourth International Conference on the Network of the Future (NoF), Pohang, Korea (South), 2013, pp. 1-5, doi: 10.1109/NOF.2013.6724515.
DMTF "Open Virtualization Format Specification" Document No. DSP0243, Version 2.1.0, pp. 1-72 (Dec. 12, 2013).
Espling, D. et al., "Modeling and Placement of Structured Cloud Services", IEEE Transactions on Network and Service Management: Special Issue on Management of Cloud Services, pp. 1-10.
ETSI Group Specification, Network Function Virtualization (NFV) Management and Orchestration, GS NFV-MAN 001 V0.6.1, pp. 1-196 (Jul. 2014).
ETSI, "An Introduction, Benefits, Enables, Challenges & Call for Action", *Network Functions Virtualisation—Introductory White Paper*, SDN and OpenFlow World Congress, Darmstadt-Germany, Issue 1: 1-16 (Oct. 22, 24, 2012).
ETSI,"Network Operator Perspectives on Industry Progress", *Network Functions Virtualisation—Update White Paper* (*NFV*), SDN and OpenFlow World Congress, Frankfurt-Germany, Issue 1: 1-16 (Oct. 15-17, 2013).
European Search Report completed Jun. 24, 2016 for European Application No. 15177503.8.
Jayasinghe, D. et al., "Improving Performance and Availability of Services Hosted on Iaas Clouds with Structural Constraint-aware Virtual Machine Placement", 2011 IEEE International Conference on Services Computing, pp. 72-29 (2011).
Larsson, L. et al., "*Scheduling and Monitoring of Internally Structured Services in Cloud Federations*", IEEE, pp. 173-178 (2011).
Network Working Group, "Service Function Chaining Problem Statement (draft-ietf-sfc-problem-statement)", Eds. Quinn, P. and Nadeau, T., pp. 1-19 (Aug. 11, 2014).

* cited by examiner

SERVICE PROVISIONING IN A COMMUNICATION NETWORK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATION

This application claims priority under 35 U.S.C. § 119 or 365 to European Patent Application No. 15177503.8, filed Jul. 20, 2015. The entire teachings of the above application are incorporated herein by reference.

FIELD OF THE INVENTION

The present invention relates to service provisioning in a communication network. More in particular, the present invention relates to allocating virtual network functions and virtual network paths of a desired service to a physical communication network comprising physical network nodes and physical network links, where the allocating is carried out subject to constraints.

BACKGROUND

In communication networks it is well known to use service requests which specify a service required from the network. A service request may include a source, a destination, a certain bandwidth, a certain quality of service and/or other parameters. The network attempts to accommodate the service request by making the requested resources available. Often, many alternative resources, such as parallel paths, are available to accommodate a requested service. Thus, a network service corresponding to a particular service request may have several alternative implementations.

The resources to be utilized by a service may be subject to constraints. A particular network service may, for example, require a certain minimum bandwidth, which imposes a bandwidth constraint. For safety and security reasons, services may be required to share a certain resource in a network node, or may be required not to share a resource.

In traditional networks, the functionality of a network node is coupled with a physical device and, hence, the establishment of a network service involves setting up physical devices, their connections and configuration. If demand changes for an existing service, or if a new service is demanded, the network operator may be required to add or remove devices from the network to increase or decrease the capacity or functionality if the existing devices cannot meet the demanded change.

Network Functions Virtualization (NFV) is a method to decouple network functions, for example router, firewall, application layer gateway, a virus scanner, from the physical device by using virtualization technologies, such as VMware. Virtualization enables physical devices to be regarded as resources on which network functions can be loaded dynamically. For example, when a network service is required to filter traffic at a certain location in a network, NFV allows for the allocation of a firewall network function to a multi-purpose device (for example, a device hosted in a cloud datacenter).

A service can be described as a Service Function Chain (SFC). An SFC defines a set of one or more network functions of a service and ordering constraints for the functions through which data packets are exposed.

ETSI Draft Specification GS-NFV-MAN V0.6.1, "Network Function Virtualization (NFV): Management and Orchestration" (2014-07) describes the management and orchestration framework required for provisioning virtualized network functions and related operations. One scenario that is described in the ETSI Draft Specification is that virtual network functions can be chained to other virtual network functions and/or physical network functions to realize a network service.

Virtual network functions and virtual network paths may be used to deploy network services independently from their physical implementations. When specifying a network service in terms of virtual network functions and virtual network paths, those functions and paths have to be allocated to their physical counterparts. Two or more virtual network functions may be collocated, that is, implemented in the same physical resource (for example, two virtual switches may be collocated in a single physical node). Alternatively, two or more virtual network functions may be non-collocated, that is, implemented in different physical resources (for example, two virtual switches may be non-collocated in two distinct physical nodes).

The paper by Espling et al., "Modeling and placement of structured cloud services", Transactions on Network and Service Management, 2013, discloses a method of using affinity constraints and anti-affinity constraints for the allocation of cloud services. Affinity constraints, also known as co-location constraints, indicate that services or service items should share a common resource, such as a node. Anti-affinity constraints indicate that services or service items should not share a common resource but should use alternative resources instead. Such constraints may for example indicate that services should not use a node in a certain country, and/or should use a certain node in the home country.

The method disclosed in Espling's paper focuses on constraints in nodes, avoiding co-location of services on the same node, for example. The use of affinity constraints and anti-affinity constraints allows a very clear definition of certain constraints, in particular constraints relating the sharing, or not sharing, of resources. However, this known method is limited in scope and only deals with network nodes.

It is often desired to specify that virtual network paths should not share a common physical path, for example to increase the reliability of a network service or to deal with bandwidth limitations. Similarly, it is also often desired to specify that virtual network paths should share a common physical path, for example for security or efficiency reasons. Prior art methods fail to provide a simple and effective manner to achieve this.

SUMMARY

It is an object of the present invention to solve this problem by providing a method which allows services to be provisioned while allowing more specific constraints to be taken into account.

It is a further object of the present invention to provide a method which may be used in network function virtualization (NFV) environments, in particular service function chain (SFC) service descriptions.

Accordingly, the present invention provides a method of provisioning a service in a communication network, the service comprising:

at least one virtual network function, and at least one virtual network path, which at least one virtual network function and at least one virtual network path are to be implemented in the communication network, which method comprises:

obtaining affinity constraints and/or anti-affinity constraints relating to mapping the at least one virtual network path onto the communication network, and mapping the at least one virtual network function and at least one virtual network path onto the communication network subject to said constraints.

By using affinity constraints and anti-affinity constraints for paths, instead of only for nodes as in the prior art, such constraints can be used more generally in the network. More in particular, affinity constraints and anti-affinity constraints may, in accordance with the present invention, be used for virtual network functions and virtual network paths in general and concern for example locations such as data centers, countries, regions etc. in addition to, or instead of, network nodes.

In accordance with the present invention, it can be specified whether paths should be mapped onto resources which are collocated (collocated virtual network paths) or whether they should be mapped onto resources which are not collocated (non-collocated virtual network paths), wherein collocated may imply sharing a datacenter, a country, a region, etc. By mapping the virtual network functions and virtual network paths onto the communication network subject to the affinity and/or anti-affinity constraints which may relate both to functions and to paths, the colocation of virtual network paths can be enforced or avoided. Similarly, the colocation of virtual network functions can be enforced or avoided.

Although the service may include only a single virtual network function, typically services will include two or more network functions. The at least one virtual network path can connect at least two virtual network functions, or at least one network function and a terminal, such as a user terminal. Some services may include two or more terminals, for example a source terminal and a destination terminal.

It is noted that affinity constraints can define colocation and that anti-affinity constraints can define non-colocation of network resources, such as virtual network functions and virtual network paths.

The step of obtaining affinity constraints and/or anti-affinity constraints may comprise retrieving said constraints from a memory, for example from a semiconductor memory of a network controller, in which a policy may be stored. The affinity and/or anti-affinity constraints and the associated policy may be previously stored in memory by a system operator or by a user, or by a processor arranged for determining constraints on the basis of network properties and/or system operator and/or user specifications. In such embodiments, the affinity constraints and/or anti-affinity constraints are provided separately from the service requests. In some embodiments, the affinity constraints and/or anti-affinity constraints can be included in a service request.

Advantageously, the method according to the present invention may further comprise:

obtaining affinity constraints and/or anti-affinity constraints relating to mapping the at least one virtual network function onto the communication network, and mapping the at least one virtual network function and at least one virtual network path onto the communication network subject to said constraints.

Accordingly, the affinity constraints and/or anti-affinity constraints may not only relate to mapping the at least one virtual network path onto the communication network, but also to mapping the at least one virtual network function onto the communication network, and the mapping may be carried out taking both any constraints relating to mapping the at least one virtual network path and any constraints relating to mapping the at least one virtual network function into account.

In an advantageous embodiment, the service is defined in a service request and the step of mapping the at least one virtual network function and the at least one virtual network path onto the communication network may comprise:

producing a network model representing the network resources, the network model comprising a resource topology, producing a request model by using the service request, the request model comprising a request topology, producing a set of matches between the resource model and the request model, subject to the affinity constraints and the anti-affinity constraints, selecting a best match from the set of matches by using an optimization, and allocating network resources to the best match.

By producing both a network model representing the available resources and a request model representing the requested resources, the requested resources can easily be compared with the available resources.

By using the affinity constraints and anti-affinity constraints to produce a set of matches, only feasible and desired matches are produced.

By using an optimization for selecting a best match, an objective criterion can be used for the best match from the set of matches.

By allocating nodes and paths to the best match, an optimal allocation of the requested service to the available resources is achieved, subject to the affinity constraints and anti-affinity constraints.

In an embodiment, the step of producing a network model comprises gathering current allocations of physical nodes and physical paths in the network.

The step of producing a network model may comprise modelling at least one of node resources, path resources, and quality of service. Similarly, the step of producing a request model may comprise modelling at least one of virtual function resources, virtual path resources, and quality of service.

Although the affinity constraints and anti-affinity constraints may be used directly, it is preferred that the step of producing the set of matches comprises translating the affinity constraints and anti-affinity constraints into optimization constraints. In an embodiment, therefore, the step of producing the set of matches comprises using integer linear programming (ILP) constraints representing the affinity constraints and anti-affinity constraints. That is, the affinity constraints and anti-affinity constraints are in such an embodiment translated into ILP constraints which can then be used in the optimization procedure.

Although various types of service requests may be used, the present invention is particularly suitable for service requests of the service function chain (SFC) type. A service can be described as a service function chain consisting of a set of virtual network functions, which may be connected in an acyclic graph structure. SFC type services are known per se and typically use an SFC template. In prior art SFC templates, certain requirements such as efficiency or security cannot be specified. By extending existing SFC templates with affinity and/or anti-affinity constraints, this problem is solved.

It is noted that by using network function virtualization (NFV) techniques, which are also known per se, network functions may be decoupled from the physical devices supporting these functions. It is further noted that the actual mapping of virtual functions and/or virtual paths onto physical nodes and/or physical paths can be determined by binary variables.

The present invention further provides a software program product for allowing a processor to carry out the method defined above. The software program product may be stored on a tangible carrier, such as a DVD or a USB stick. Alternatively, the software program product may be stored on a server from which it may be downloaded using the Internet. The software program product contains software instructions which can be carried out by the processor of a device, such as a server, a user device (for example a smartphone), and/or a monitoring device.

The present invention additionally provides a system for provisioning a service in a communication network, the service comprising:

at least one virtual network function, and at least one virtual network path, which at least one virtual network function and at least one virtual network path are to be implemented in the communication network, which system comprises a processor and a memory, wherein the memory is configured for:

storing affinity constraints and/or anti-affinity constraints relating to mapping the at least one virtual network path onto the communication network, and wherein the processor is configured for:

mapping the at least one virtual network function and the at least one virtual network path onto the communication network subject to said constraints.

In an embodiment, the processor of the system is configured for retrieving affinity constraints and/or anti-affinity constraints from a memory in which a policy is stored. The policy may be a user-defined policy or an operator-defined policy, or a policy which is partly user-defined and partly operator-defined.

The processor of the system may further be configured for:

obtaining affinity constraints and/or anti-affinity constraints relating to mapping the at least one virtual network function onto the communication network, and mapping the at least one virtual network function and at least one virtual network path onto the communication network subject to said constraints.

The processor of the system may advantageously still further be configured for:

producing a network model representing the network resources, the network model comprising a resource topology, producing a request model by using a service request defining the service, the request model comprising a request topology, producing a set of matches between the resource model and the request model, subject to the affinity constraints and the anti-affinity constraints, selecting a best match from the set of matches by using an optimization, and allocating network resources to the best match.

These embodiments of the system provide the same advantages as the corresponding method steps discussed above.

BRIEF DESCRIPTION OF THE DRAWINGS

The present invention will further be explained with reference to exemplary embodiments illustrated in the drawings, in which.

DETAILED DESCRIPTION

A description of example embodiments of the invention follows.

The teachings of all patents, published applications and references cited herein are incorporated by reference in their entirety.

The present invention allows service requests to be processed while allowing more specific constraints to be taken into account. In particular, constraints relating to the colocation and non-colocation of both virtual network functions and virtual network paths can be used and can be defined as affinity constraints and non-affinity constraints respectively.

As discussed above, the present invention can be summarized as obtaining affinity constraints and/or anti-affinity constraints relating to mapping the at least one virtual network path onto the communication network, and mapping the at least one virtual network function and at least one virtual network path onto the communication network subject to said constraints. Although the present invention could be applied to the mapping of virtual network paths only, the invention is not so limited and may also be applied to the mapping of virtual network functions.

The present invention will be explained below with reference to specific embodiments, in particular Network Function Virtualization (NFV) related embodiments. The invention is however not so limited and may be utilized in embodiments which do not use NFV. Network Function Virtualization is a technique to decouple network functions (such as router or firewall) from the corresponding physical devices by using information technology (IT) virtualization technologies, such as VMware products. Similarly, Software Defined Networking (SDN) is a technique to decouple the routing control plane from the forwarding plane by using programmable networking technologies, such as OpenFlow. These programmable networking technologies allow slicing the network resources into multiple virtual networks which can accommodate networking resources from multiple services in an isolated manner, thus providing a possibility to create virtual networks interconnecting the virtual network function.

Figure 1:
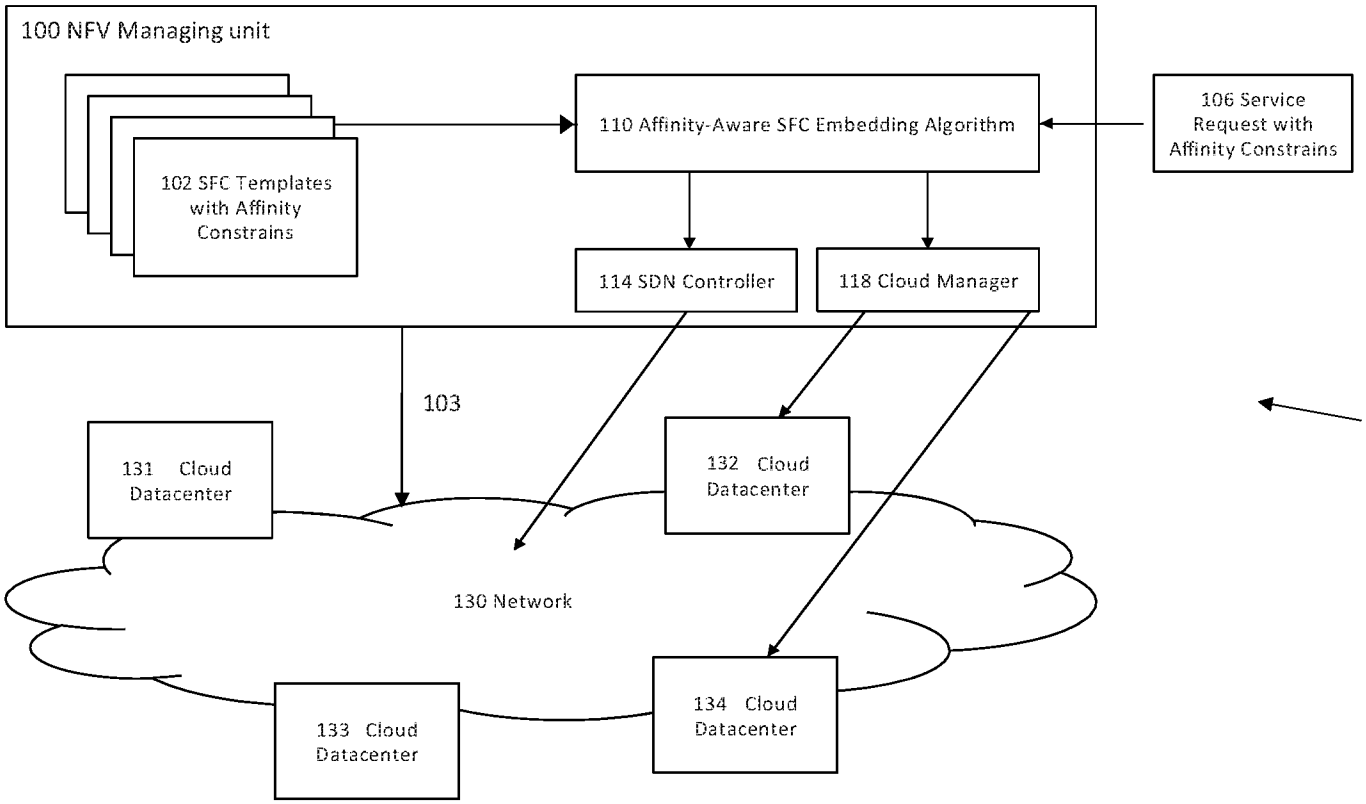
FIG. 1 schematically shows an exemplary communication system in which the present invention may be utilized.

The embodiment of a communication system illustrated in FIG. 1 is configured for network services which are described as a Service Function Chain (SFC). An SFC consists of a set of virtual network functions, which can be represented as being connected in an acyclic graph structure. The edges of the graph structure describe the rules (for example OpenFlow rules) which determine how data are forwarded from one network function to another. The SFC-related embodiment is merely exemplary and other embodiments can be envisaged which are not, or not specifically, configured for SFC.

For the sake of brevity, the abbreviation A&AA constraints will be used to refer to affinity constraints and/or anti-affinity constraints. The term A&AA constraints may therefore cover affinity constraints only, anti-affinity constraints only, or both affinity constraints and anti-affinity constraints.

The communication system 1 which is schematically illustrated in FIG. 1 is shown to comprise an NFV managing unit 100, a (physical) communication network 130 and a plurality of cloud datacenters 131, 132, 133 and 134 connected to the network 130. The NFV managing unit 100 is connected to the network 130 through a connection 103.

Figure 6:
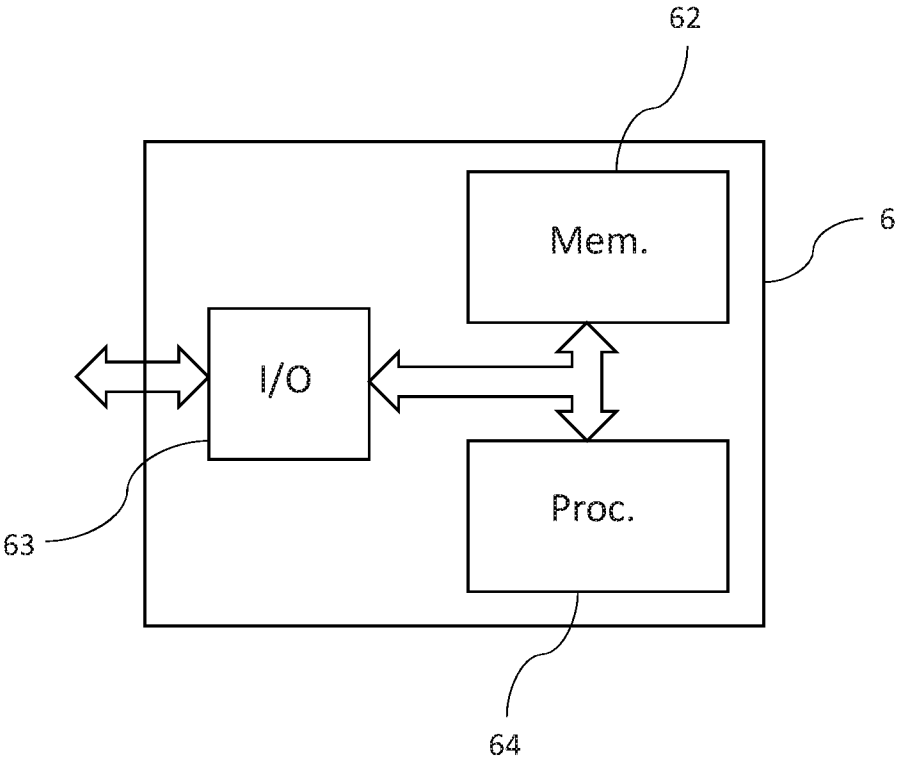
FIG. 6 schematically shows an exemplary embodiment of a controller for use in a service provisioning system.

The NFV managing unit 100 includes a processor (not shown in FIG. 1) which is configured for carrying out an A&AA-aware SFC embedding algorithm 110, which may be stored in a memory associated with the processor (see also FIG. 6). Accordingly, the algorithm 110 is implemented as a software program including processor instructions which cause the processor to carry out the algorithm steps.

Affinity constraints and/or anti-affinity constraints can be contained in SFC templates 102 and/or in service requests 106. The processor can be configured for extracting A&AA constraints from the SFC templates 102 and/or the service requests 106. The SFC embedding algorithm can be configured for assigning physical hardware and resources, such as physical nodes and physical paths, to the service requests, based upon information stored in the SFC templates. More in particular, the algorithm can determine in which of the datacenters 131-134 the virtual network functions (VNFs) and the virtual networks paths (VNPs) of a requested service are to be implemented and which resources are to be assigned to the service. As explained above, the present invention may apply to the mapping and implementation of virtual network paths (VNPs) only, but preferably applies to the mapping and implementation of both virtual network paths (VNPs) and virtual network functions (VNFs).

The NFV managing unit 100 further includes a cloud manager 118 and an SDN (Software Defined Network) controller 114. The cloud manager 118 carries out the management of deployed VNFs, VNPs and cloud server resources. An SDN (Software Defined Network) controller 114 configures network paths and network resources (which may include bandwidth), based on assignments made by the algorithm 110.

In accordance with the present invention, the A&AA constraints are taken into account when mapping VNFs onto the physical network 130. The algorithm 110 can be based upon an integer linear programming (ILP) model and is configured to support the specific characteristics of NFV and the AA&A constraints.

An affinity constraint, which will later be described in more detail with reference to FIG. 5, may have the following format:

Affinity(LocA, B)

where LocA is a location, such as a node, a city or a country, and B is a virtual network item, such as a virtual network path. This affinity relationship states that item B is to be located in location LocA. If another affinity constraint reads:

Affinity(LocA, C)

where LocA is the same location as before and C is a virtual network item, then the two constraints imply that items B and C are to be collocated.

An anti-affinity constraint may have the following format:

Anti-Affinity(D, E)

where D and E are virtual network items, such as virtual network paths or virtual network functions. This anti-affinity relationship states that items D and E are not to be collocated.

An affinity constraint may alternatively have the following format:

Affinity(LocTypF, G, H)

where LocTypF is the physical location type (for example datacenter, network domain) and where G and H are virtual network items, such as virtual network functions. This affinity relationship states that items G and H should share the same location (that is, be collocated) with respect to a certain location type LocTypF. For example, Affinity(Datacenter, G, H) defines that network items G and H should be collocated in the same datacenter, independent of the location of this datacenter.

Affinity constraints and anti-affinity constraints as may be applied in the present invention are defined in more detail below using, by way of example, an XML Schema Definition (XSD):

Preliminary Definitions:

```
<xs:element name="LocationType" type="xs:string" />
<xs:element name="FunctionType" type="xs:string" />
<xs:element name="Connection">
  <xs:complexType>
    <xs:all>
      <xs:element name="source" type="NetworkFunction" />
      <xs:element name="sink" type="NetworkFunction" />
    </xs:all>
  </xs:complexType>
</xs:element>
<xs:element name="NetworkFunction">
  <xs:complexType>
    <xs:all>
      <xs:element name="functionType" type="FunctionType" />
    </xs:all>
  </xs:complexType>
</xs:element>
<xs:element name="Location">
  <xs:complexType>
    <xs:sequence>
      <xs:element name="locationType" type="LocationType" />
    </xs:sequence>
  </xs:complexType>
</xs:element>
<xs:element name="Percentage">
  <xs:simpleType>
    <xs:restriction base="xs:decimal">
      <xs:minExclusive value="0"/>
      <xs:maxInclusive value="100"/>
    </xs:restriction>
  </xs:simpleType>
</xs:element>
<xs:element name="Constraint">
  <xs:complexType />
</xs:element>
```

Definition of Affinity Constraints:

```
<xs:element name="Affinity" type="Constraint">
  <xs:complexType>
    <xs:choice>
      <xs:sequence>
        <xs:choice>
          <xs:element name="locationType" type="LocationType" />
          <xs:element name="location" type="Location" />
        </xs:choice>
        <xs:choice>
          <xs:element name="functionTypeA" type="FunctionType" />
          <xs:element name="functionA" type="NetworkFunction" />
        </xs:choice>
        <xs:choice minOccurs="0">
          <xs:element name="functionTypeB" type="FunctionType" />
          <xs:element name="functionB" type="NetworkFunction" />
        </xs:choice>
      </xs:sequence>
      <xs:sequence>
        <xs:element name="connectionC" type="Connection" />
        <xs:choice>
        <xs:element name="connectionD" type="Connection" />
        <xs:choice>
          <xs:element name="locationType" type="LocationType" />
          <xs:element name="location" type="Location" />
        </xs:choice>
        </xs:choice>
        <xs:element name="percentage" type="Percentage" minOccurs="0" />
      </xs:sequence>
    </xs:choice>
  </xs:complexType>
</xs:element>
```

Definition of Anti-Affinity Constraints:

```
<xs:element name="AntiAffinity" type="Constraint">
  <xs:complexType>
    <xs:choice>
      <xs:sequence>
        <xs:choice>
          <xs:element name="locationType" type="LocationType" />
          <xs:element name="location" type="Location" />
        </xs:choice>
        <xs:choice>
          <xs:element name="functionTypeA" type="FunctionType" />
          <xs:element name="functionA" type="NetworkFunction" />
        </xs:choice>
        <xs:choice minOccurs="0">
          <xs:element name="functionTypeB" type="FunctionType" />
          <xs:element name="functionB" type="NetworkFunction" />
        </xs:choice>
      </xs:sequence>
      <xs:sequence>
        <xs:element name="connectionC" type="Connection" />
        <xs:choice>
          <xs:element name="connectionD" type="Connection" />
          <xs:choice>
            <xs:element name="locationType" type="LocationType" />
            <xs:element name="location" type="Location" />
          </xs:choice>
        </xs:choice>
      </xs:sequence>
    </xs:choice>
  </xs:complexType>
</xs:element>
```

Figure 2:
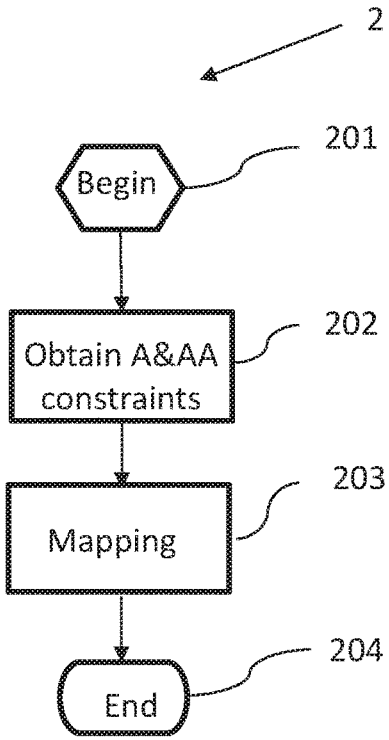
FIG. 2 schematically shows a first embodiment of the method according to the present invention.

The main steps of a method in accordance with the present invention are illustrated in FIG. 2. The exemplary method 2 comprises a first step 201 in which the method begins and in which a service request may be received or retrieved. In a second step 202, A&AA constraints are obtained, for example previously stored constraints, or constraints contained in a service request or an SFC template.

In a third step 203, the virtual network functions and/or virtual network paths specified in the service request are mapped onto the (physical) communication network, subject to the A&AA constraints. In a fourth step 204, the method ends.

Figure 3:
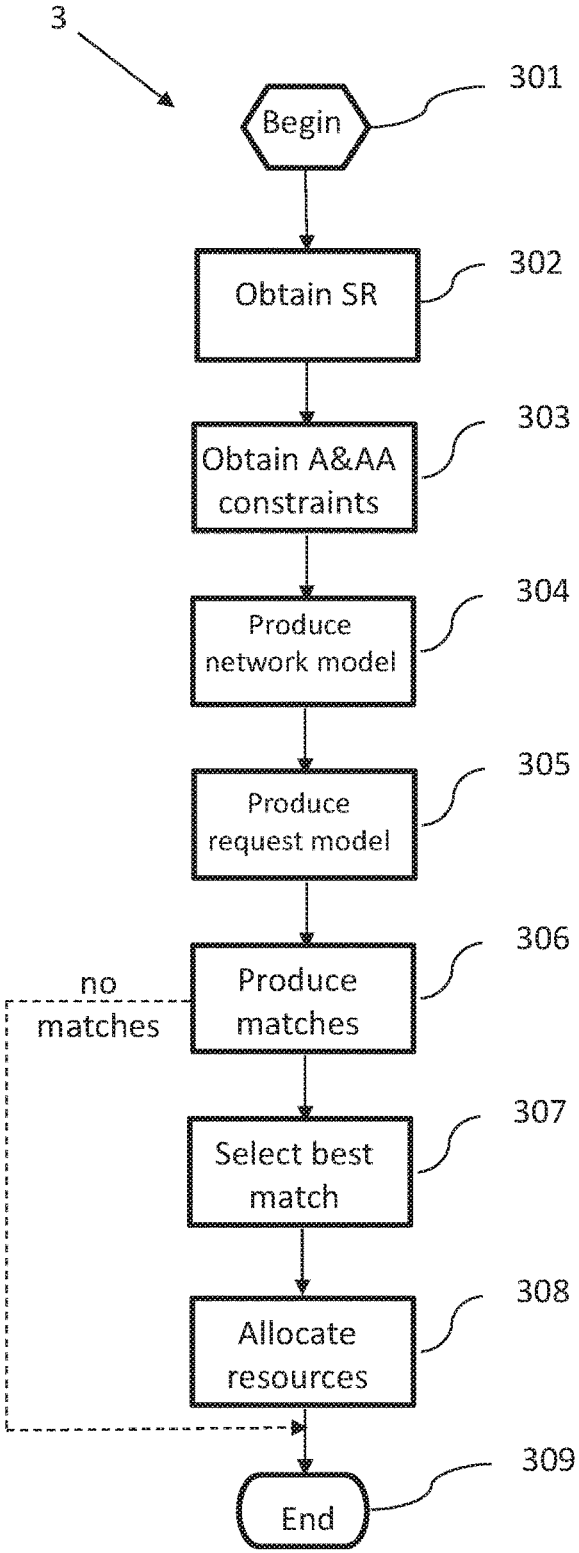
FIG. 3 schematically shows a second embodiment of the method according to the present invention.

An embodiment of the method according to the present invention is illustrated in more detail in FIG. 3.

In the exemplary embodiment of FIG. 3, the method 3 begins in step 301. In step 302 ("Obtain SR"), a service request (SR) is obtained, while in step 303 ("Obtain A&AA constraints"), A&AA constraints are obtained. In step 304 ("Produce network model"), a network model representing the resources of the network is produced. This network model can comprise a resource topology. In step 305 ("Produce request model"), a request model is produced which represents the resources required by the service request. This request model can comprise a request topology.

In step 306 ("Produce matches"), a set of matches between the network model and the request model is produced, subject to the A&AA constraints. If no match is found, the method jumps to step 309 ("End"), where it ends. If at least one match is found, the best match is selected in step 307 ("Select best match") using an optimization, for example Integer Linear Programming (ILP).

In step 308 ("Allocate resources"), the resources are allocated in accordance with the best match and the method ends in step 309.

Figure 4:
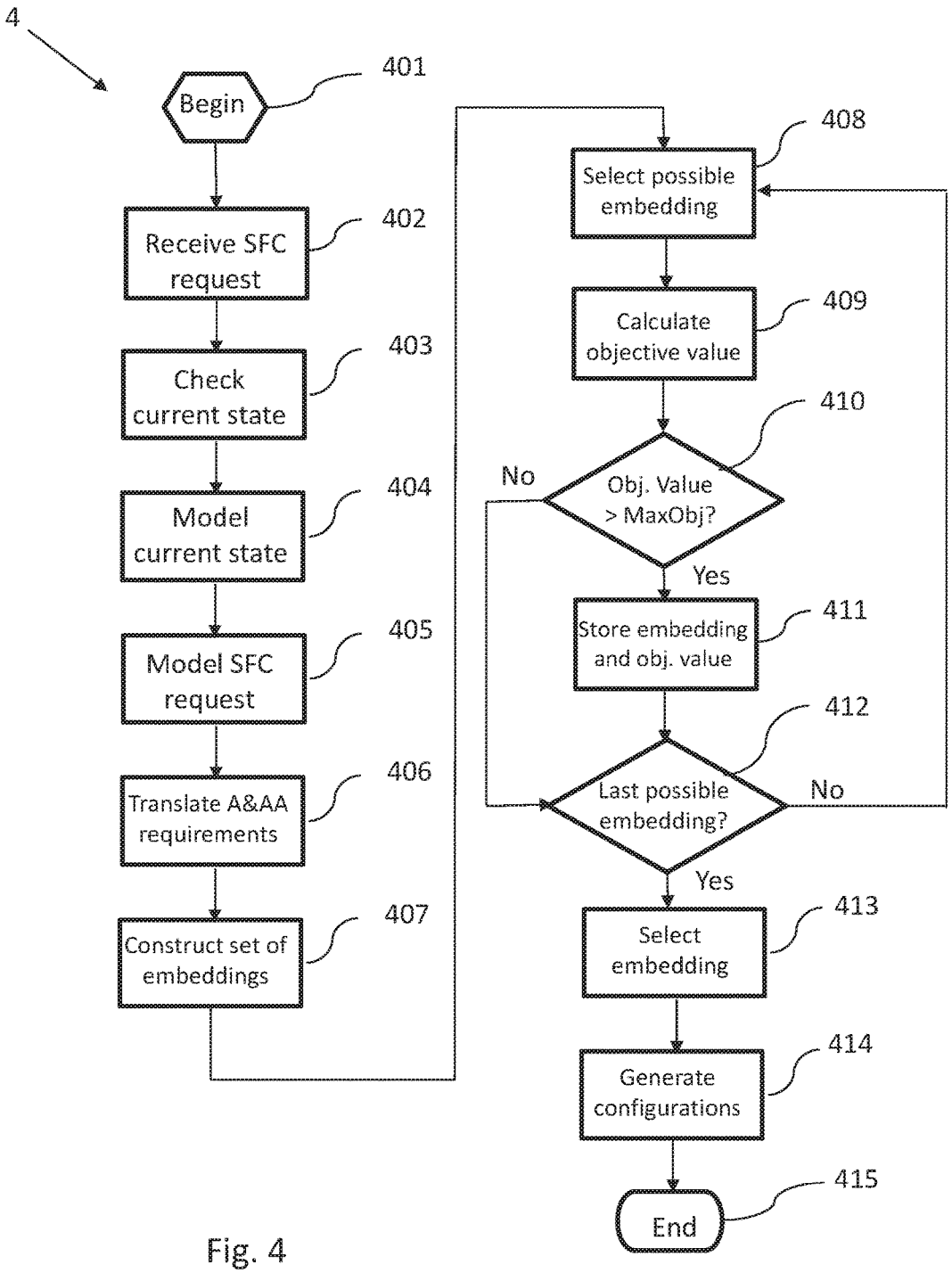
FIG. 4 schematically shows a third embodiment of the method according to the present invention.

A further embodiment of a method in accordance with the present invention is illustrated in FIG. 4. The exemplary method 4 of FIG. 4, which may be triggered by the receipt of an SFC request or an SFC template, for example, comprises an initial step 401 ("Begin") in which the method is initiated. This initial step 401 is followed by a step 402 ("Receive SFC request") in which a new SFC request or an SFC request based upon an SFC template is received (for example by the NFV managing unit 100 in FIG. 1). The method then checks in step 403 ("Check current state of network resources") the current state of the nodes and paths of the (physical) communication network by gathering the current allocations of network nodes and links. Using this information, the method generates in step 404 ("Model current state of network") a model of the current state of the network, preferably including a topology graph containing nodes and paths, the available node resources (for example CPU capacity, RAM capacity, switching capacity, etc.), the available path resources or characteristics (for example bandwidth, link delay, etc.).

Similarly, the method produces a request model, which may include a virtual topology model including virtual network functions and virtual network paths, in step 405 ("Model SFC request"). This request model may include virtual network functions, virtual network paths, the required node resources (for example CPU capacity, RAM capacity, switching capacity, etc.), the required path resources or characteristics (for example bandwidth, link delay, etc.), and the required quality of service (for example end-to-end delay).

In step 406 ("Translate affinity/anti-affinity requirements into ILP constraints"), the A&AA constraints which are associated with virtual network functions and virtual network links are modelled as constraints of an optimization. To this end, in the embodiment shown, the A&AA constraints are converted into ILP (Integer Linear Programming) constraints. For each combination of a virtual function and a physical node, and for each combination of a virtual path and a physical path, a binary variable is defined which indicates whether the virtual resource (that is, the virtual network function or virtual network path) is mapped onto the physical resource. Thus, the affinity constraints and anti-affinity constraints can be modelled, using these binary variables, in an optimization procedure.

In step 407 ("Construct set of embeddings adhering to constraints"), a set of feasible mappings (which may also be referred to as "embeddings" or "matches") subject to the constraints, is generated. In step 408 ("Select possible embedding"), one feasible mapping is selected from the set and its objective value is calculated in step 409 ("Calculate objective value for embedding"). This calculation may be based on (a combination of) cost, degree of request acceptance, load balancing, and/or other criteria. In step 410 ("Objective value>MaxObj?"), this objective value is compared with a stored value MaxObj (which may initially be zero). If the objective value is greater than MaxObj (Yes), then the method continues with step 411 ("Store embedding and objective value as MaxObj"), else (No) the method jumps to step 412 ("Last possible embedding?").

In step 411, the mapping being evaluated is stored and its objective value is used as the new value of MaxObj. In step 412, the method checks whether the set of mappings has been exhausted. If this is not the case (No), the method returns to step 408, but if all mappings have been evaluated, the method continues with step 413 ("Select embedding with MaxObj"), where the mapping having the highest value of MaxObj is selected. In step 414 ("Generate node and link configurations"), this selected mapping is used to generate node and path configurations. The path configurations are sent to the SDN controller (114 in FIG. 1), while the node configurations are sent to the appropriate Cloud Manager (118 in FIG. 1). The method ends in step 415 ("End").

It is noted that the above method may be carried out by the NFV managing unit 100 illustrated in FIG. 1. It is further noted that several aspects of the method of FIG. 4 are only exemplary. For example, instead of an optimization which maximizes a value (MaxObj), an optimization which minimizes another value could be used.

Figure 5:
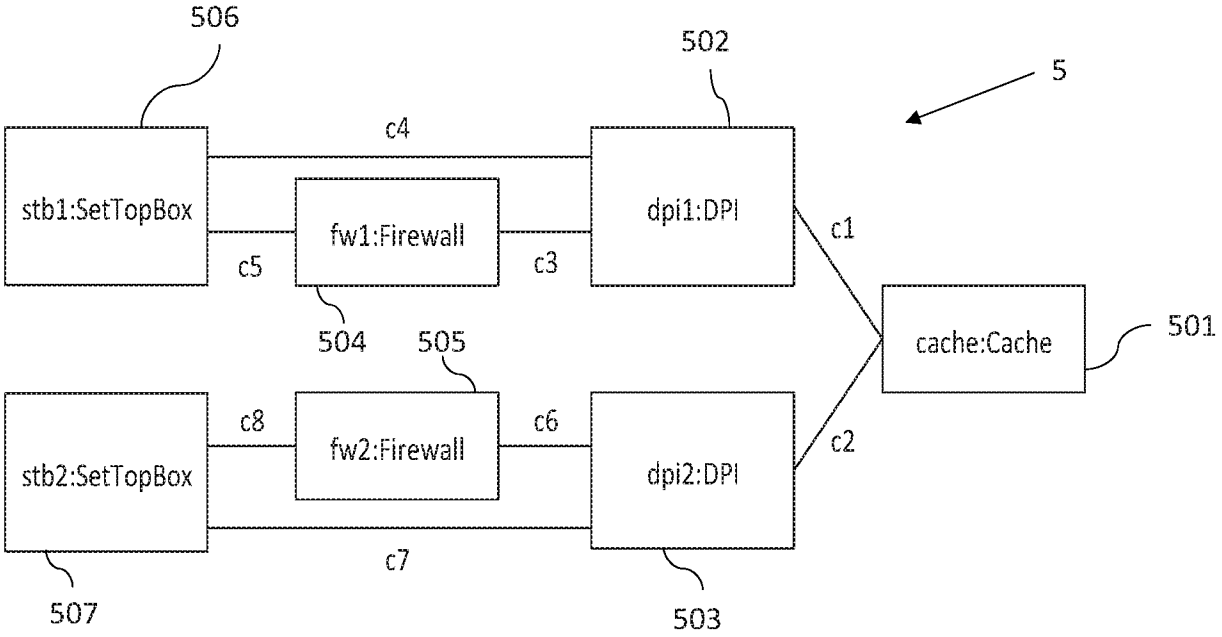
FIG. 5 schematically shows an exemplary embodiment of a service function chain (SFC) as may be utilised in the present invention.

An example of an SFC is illustrated in FIG. 5. In the exemplary SFC (Service Function Chain) 5 of FIG. 5 a content cache is shown to be connected to two DPI (Deep Packet Inspection) functions 502 and 503. These DPI functions 502 and 503 are connected to firewalls 504 and 505 and set-top boxes 506 and 507 respectively. The firewalls serve to filter and the set-top boxes to render the content. The DPI functions may either directly forward content to the set-top boxes or send the content via the firewall for filtering.

By way of example the following constraints are considered:

Affinity(Belgium, stb1)
Affinity(Netherlands, stb2)
Affinity(Datacenter, c3, 100)
Affinity(Datacenter, c6, 100)
AntiAffinity(c1, c2)
AntiAffinity(Datacenter, DPI)

The first two constraints state that the virtual set-top boxes need to be located in Belgium and The Netherlands respectively (for example because they should be close to the end user). The third and fourth constraint define that the connections c3 and c6 between the firewalls 504 and 505 on the one hand and DPI functions 502 and 503 on the other hand should be completely embedded within a single data center, automatically forcing the DPI function and the associated firewall to also be deployed within that data center. Finally, to improve fault tolerance, it is stated that connections c1 and c2 cannot have any links in common and the DPI functions need to be deployed within different data centers.

Using the XML Schema Definition provided above, these constraints can be described as follows:

```
<Affinity>
  <location>Belgium</location>
  <functionA>stb1</functionA>
</Affinity>
<Affinity>
  <location>Netherlands</location>
  <functionA>stb2</functionA>
</Affinity>
```

-continued

```
<Affinity>
  <locationType>Datacenter</locationType>
  <connectionC>c3</connectionC>
  <percentage>100</percentage>
</Affinity>
<Affinity>
  <locationType>Datacenter</locationType>
  <connectionC>c6</connectionC>
  <percentage>100</percentage>
</Affinity>
<AntiAffinity>
  <connectionC>c1</connectionC>
  <connectionD>c2</connectionD>
</AntiAffinity>
<AntiAffinity>
  <locationType>Datacenter</locationType>
  <functionTypeA>DPI</functionTypeA>
</AntiAffinity>
```

In FIG. 6 a controller for use in the NFV managing unit 100 of FIG. 1 is schematically illustrated. The controller 6 is shown to include a processor 61 coupled with an associated memory 62 and an I/O (input/output) unit 63. The memory 62 is capable of storing a software program causing the processor 61 to carry out the method steps of the present invention.

The present invention can be said to provide:

a set of (anti-)affinity constraints for both virtual network functions and virtual network paths between the virtual network functions, a syntax to define these constraints in the context of an SFC template, and an allocation algorithm that allows service requests (for example related to SFC templates) to be mapped onto physical resources.

This allows services to be provisioned by mapping the virtual network functions and virtual network paths onto a physical network subject to colocation and non-colocation requirements.

It will be understood that the description of the invention given above is not intended to limit the invention in any way. Singular nouns and the articles "a" and "an" are of course not meant to exclude the possibility of plurals. Devices mentioned in this document, such as smartphones, may be replaced with their successors, even if these successors are not yet known at the time of writing. As is well established in the law of patents, the abstract should never be used to limit the scope of the claims, and neither should reference numbers in the claims.

It will further be understood by those skilled in the art that the present invention is not limited to the embodiments mentioned above and that many additions and modifications are possible without departing for the scope of the invention as defined in the appending claims.

What is claimed is:

1. A method of provisioning a service in a communication network, the service comprising:

at least one virtual network function, and at least [one] *two* virtual network [path] *paths*, which at least one virtual network function and at least [one] *two* virtual network [path] *paths* are to be implemented in the communication network, and wherein the at least [one] *two* virtual network [path is a connection] *paths are connections* to the at least one virtual network function, which method comprises:

obtaining affinity constraints and/or anti-affinity constraints relating to mapping the at least [one] *two* virtual network [path] *paths* onto the communication network, wherein said affinity and anti-affinity constraints comprise constraints on [location] *colocation* of the at least [one] *two* virtual network [path] *paths*, and mapping the at least one virtual network function and at least [one] *two* virtual network [path] *paths* onto the communication network subject to said constraints.

2. The method according to claim 1, wherein the step of obtaining affinity constraints and/or anti-affinity constraints comprises retrieving said constraints from a policy.

3. The method according to claim 2, wherein the policy is a user-defined policy and/or an operator-defined policy.

4. The method according to claim 1, wherein the method further comprises:

obtaining affinity constraints and/or anti-affinity constraints relating to mapping the at least one virtual network function onto the communication network, and mapping the at least one virtual network function and at least [one] *two* virtual network [path] *paths* onto the communication network subject to said constraints.

5. The method according to claim 1, wherein the service is defined in a service request, and wherein the step of mapping the at least one virtual network function and at least [one] *two* virtual network [path] *paths* onto the communication network comprises:

producing a network model representing the network resources, the network model comprising a resource topology, producing a request model by using the service request, the request model comprising a request topology, producing a set of matches between the resource model and the request model, subject to the affinity constraints and the anti-affinity constraints, selecting a best match from the set of matches by using an optimisation, and allocating network resources to the best match.

6. The method according to claim 5, wherein the step of producing a network model comprises gathering current allocations of physical nodes and physical paths.

7. The method according to claim 5, wherein the step of producing a network model comprises modelling at least one of node resources, path resources, and quality of service.

8. The method according to claim 5, wherein the step of producing a request model comprises modelling at least one of virtual function resources, virtual path resources, and quality of service.

9. The method according to claim 1, wherein the step of producing the set of matches comprises translating the affinity constraints and anti-affinity constraints into optimisation constraints.

10. The method according to claim 9, wherein the step of producing the set of matches comprises using integer linear programming constraints representing the affinity constraints and anti-affinity constraints.

11. The method according to claim 1, wherein the service request relates to a service function chain type of service.

12. A software program product for allowing a processor to carry out the method according to claim 1.

13. A system for provisioning a service in a communication network, the service comprising:

at least one virtual network function, and at least [one] *two* virtual network [path] *paths*, which at least one virtual network [functions] *function* and at least [one] *two* virtual network paths are to be implemented in the communication network, and wherein the at least [one] *two* virtual network [path is a] *paths are* [connections] *connections* to the at least one virtual network function, which system comprises a processor and a memory, wherein the memory is configured for:

storing affinity constraints and/or anti-affinity constraints relating to mapping of the at least [one] *two* virtual network [path] *paths* onto the communication network, wherein said affinity and anti-affinity constraints comprise constraints on [location]*colocation* of the at least [one] *two* virtual network [path] *paths*, and wherein the processor is configured for:

mapping the at least one virtual network function and at least [one] *two* virtual network [path] *paths* onto the communication network subject to said constraints.

14. The system according to claim 13, wherein the processor is further configured for:

obtaining affinity constraints and/or anti-affinity constraints relating to mapping the at least one virtual network function onto the communication network, and mapping the at least one virtual network function and at least [one] *two* virtual network [path] *paths* onto the communication network subject to said constraints.

15. The system according to claim 13, wherein the processor is further configured for:

producing a network model representing the network resources, the network model comprising a resource topology, producing a request model by using a service request defining the service, the request model comprising a request topology, producing a set of matches between the resource model and the request model, subject to the affinity constraints and the anti-affinity constraints, selecting a best match from the set of matches by using an optimisation, and allocating network resources to the best match.

* * * * *